(12) United States Patent
Chu et al.

(10) Patent No.: US 12,073,715 B2
(45) Date of Patent: Aug. 27, 2024

(54) EDGE CLOUD SYSTEM, SERVER AND CLOUD CONTROL PLATFORM

(71) Applicants: CHINA INTELLIGENT AND CONNECTED VEHICLES (BEIJING) RESEARCH INSTITUTE CO., LTD., Beijing (CN); Tsinghua University, Beijing (CN)

(72) Inventors: Wenbo Chu, Beijing (CN); Keqiang Li, Beijing (CN); Xiaoping Du, Beijing (CN); Qiqige Wuniri, Beijing (CN); Bin Liu, Beijing (CN); Dongxin Lv, Beijing (CN)

(73) Assignees: CHINA INTELLECTUAL AND CONNECTED VEHICLES (BEIJING) RESEARCH INSTITUTE CO., LTD., Beijing (CN); Tsinghua University, Beijing (CN)

( * ) Notice: Subject to any disclaimer, the term of this patent is extended or adjusted under 35 U.S.C. 154(b) by 255 days.

(21) Appl. No.: 17/623,860

(22) PCT Filed: May 27, 2021

(86) PCT No.: PCT/CN2021/096315
§ 371 (c)(1),
(2) Date: Dec. 29, 2021

(87) PCT Pub. No.: WO2022/121246
PCT Pub. Date: Jun. 16, 2022

(65) Prior Publication Data
US 2023/0252891 A1   Aug. 10, 2023

(30) Foreign Application Priority Data
Dec. 11, 2020   (CN) .................. 202011440869.X

(51) Int. Cl.
*G06F 12/12* (2016.01)
*G06F 12/128* (2016.01)
*G08G 1/01* (2006.01)

(52) U.S. Cl.
CPC .......... *G08G 1/0133* (2013.01); *G06F 12/128* (2013.01)

(58) Field of Classification Search
CPC ....... G06F 12/12; G06F 12/127; G06F 12/128
See application file for complete search history.

(56) References Cited

U.S. PATENT DOCUMENTS 10,122,547 B2 * 11/2018 Mahindra ........... H04L 47/2441
10,334,069 B2 *  6/2019 Barton ................ H04L 67/5681
(Continued)

FOREIGN PATENT DOCUMENTS

CN   109688224 A   4/2019
CN   109714730 A   5/2019
(Continued)

OTHER PUBLICATIONS

F. Liu, G. Tang, Y. Li, Z. Cai, X. Zhang and T. Zhou, "A Survey on Edge Computing Systems and Tools," in Proceedings of the IEEE, vol. 107, No. 8, pp. 1537-1562, Aug. 2019.*
(Continued)

*Primary Examiner* — Pierre Michel Bataille

(57) ABSTRACT

The present application discloses an edge cloud system, a server, and a cloud control platform. The edge cloud system includes: an edge cloud access gateway module configured to access data of the road side terminal, the vehicle terminal, the third party platform and the regional cloud; a standardized hierarchical sharing interface module connected to the edge cloud access gateway module, wherein the standardized hierarchical sharing interface module is configured to standardize and classify the data of the road side terminal, (Continued)

the vehicle terminal, the third party platform and the regional cloud accessed by the edge cloud access gateway module to form multiple levels of standardized data; wherein standardized data at each level of the multiple levels of standardized data is available to be called only by a module with corresponding level of that of the standardized data.

8 Claims, 5 Drawing Sheets

(56) References Cited

U.S. PATENT DOCUMENTS

| | | | |
|---|---|---|---|
| 11,751,042 B2 * | 9/2023 | Poornachandran | H04L 45/302 |
| | | | 455/432.1 |
| 2010/0318742 A1 | 12/2010 | Plondke | |
| 2018/0227386 A1 * | 8/2018 | Duan | G07C 5/008 |
| 2018/0331885 A1 * | 11/2018 | Raymond | H04L 41/0897 |
| 2019/0102302 A1 | 4/2019 | Taht | |
| 2019/0158606 A1 * | 5/2019 | Guim Bernat | H04W 40/20 |
| 2020/0034351 A1 | 1/2020 | Matsugatani et al. | |
| 2020/0145337 A1 | 5/2020 | Keating et al. | |
| 2020/0274942 A1 * | 8/2020 | Mueck | H04L 67/568 |
| 2021/0144202 A1 * | 5/2021 | Maciocco | H04L 67/1051 |
| 2022/0224776 A1 * | 7/2022 | Doshi | G06F 12/0897 |
| 2022/0337481 A1 * | 10/2022 | Guim Bernat | G06F 9/5072 |

FOREIGN PATENT DOCUMENTS

| | | |
|---|---|---|
| CN | 109831516 A | 5/2019 |
| CN | 109831517 A | 5/2019 |
| CN | 110674432 A | 1/2020 |
| CN | 111683129 A | 9/2020 |
| CN | 11835558 A | 10/2020 |
| CN | 111800443 A | 10/2020 |
| CN | 112769891 A | 5/2021 |
| JP | 2015-153096 A | 8/2015 |

OTHER PUBLICATIONS

T. Qiu, J. Chi, X. Zhou, Z. Ning, M. Atiquzzaman and D. O. Wu, "Edge Computing in Industrial Internet of Things: Architecture, Advances and Challenges," in IEEE Communications Surveys & Tutorials, vol. 22, No. 4, pp. 2462-2488.*

Lakshmish Ramaswamy et al.: Cache Clouds: Cooperative Caching of Dynamic Documents in Edge Networks, Proceedings of the 25th IEEE International Conference on Distributed Computing Systems, 1063-6927/05, 2005.*

A. Wang, Z. Zha, Y. Guo and S. Chen, "Software-Defined Networking Enhanced Edge Computing: A Network-Centric Survey," in Proceedings of the IEEE, vol. 107, No. 8, pp. 1500-1519, Aug. 2019.*

The First Office Action for Chinese Patent Application No. 202011440869.X, dated Aug. 3, 2022.

"White paper of Vehicle-Road-Cloud Integrated Control System," Sep. 2020.

International Search Report dated Sep. 9, 2021 for Application No. PCT/CN2021/096315.

* cited by examiner

EDGE CLOUD SYSTEM, SERVER AND CLOUD CONTROL PLATFORM

CROSS-REFERENCE TO RELATED APPLICATION

This application is a National Stage of International Application No. PCT/CN2021/096315 filed on May 27, 2021, which claims priority to Chinese Patent Application No. 202011440869. X entitled "EDGE CLOUD SYSTEM, SERVER AND CLOUD CONTROL PLATFORM" and filed on Dec. 11, 2020, both of which are hereby incorporated by reference in their entireties.

TECHNICAL FIELD

This application relates to a technical field of cloud computing, and in particular, to an edge cloud system, a server, and a cloud control platform.

BACKGROUND

ICVs have complex relationships between intelligence and networking, large amounts of information exchange, complex data processing, and high requirements for real-time data transmission. These are problems that cannot be solved by the vehicle alone. Therefore, there is an urgent need for the support of big data and cloud platforms. Vehicle data, environmental data, and network data are hierarchically integrated and calculated through the on-board computing platform and cloud big data platform, and the result of the calculation is transmitted to the vehicle as vehicle control information for the vehicle to make path planning and other decisions.

The cloud control base platform includes three layers of clouds, i.e., edge cloud, regional cloud and central cloud. As a core component of the cloud control base platform, the services of the edge cloud mainly include real-time data services such as perception and warning for driving safety, as well as decision and control services for driving efficiency and energy saving. Therefore, the performance of edge cloud requires real-time and low latency capabilities.

The existing edge cloud systems all adopt an information silo architecture to process data hierarchically, which results in slow data processing speed and high latency.

SUMMARY

The embodiments of the present application provide an edge cloud system, a server, and a cloud control platform.

According to the embodiments of a first aspect of the present application, an edge cloud system is provided. The edge cloud system includes:

an edge cloud access gateway module configured to access data of a road side terminal, a vehicle terminal, a third party platform and a regional cloud;

a standardized hierarchical sharing interface module connected to the edge cloud access gateway module, wherein the standardized hierarchical sharing interface module is configured to standardize and classify the data of the road side terminal, the vehicle terminal, the third party platform and the regional cloud accessed by the edge cloud access gateway module to form multiple levels of standardized data, wherein each level of standardized data of the multiple levels of standardized data is available to be called by only a module of a level corresponding to that level of standardized data.

In the embodiments of the first aspect of the present application, the edge cloud system further includes:

a cache module connected to the edge cloud access gateway module, wherein the cache module is configured to temporarily cache the data of the road side terminal, the vehicle terminal, the third party platform and the regional cloud accessed by the edge cloud access gateway module.

In the embodiments of the first aspect of the present application, the cache module includes:

a cache replacement strategy module configured to set a replacement strategy and a cache parameter according to a scenario of the data of the road side terminal, the vehicle terminal, the third party platform and the regional cloud accessed by the edge cloud access gateway module;

an adaptive cache partition configured to select a cache structure according to the replacement strategy and cache the data of the road side terminal, the vehicle terminal, the third party platform and the regional cloud accessed by the edge cloud access gateway module according to the cache parameter.

In the embodiments of the first aspect of the present application, the edge cloud system further includes:

a fusion perception module connected to the standardized hierarchical sharing interface module, wherein the fusion perception module is configured to perform road traffic prediction and analysis according to the data cached by the cache module.

In the embodiments of the first aspect of the present application, the edge cloud system further includes:

a cooperative decision control module connected to the cache module, wherein the cooperative decision control module is configured to perform vehicle driving data analysis and calculation according to the data cached by the cache module.

In the embodiments of the first aspect of the present application, the edge cloud access gateway module includes:

a road-cloud gateway unit configured to access the data of the road side terminal;

a vehicle-cloud gateway unit configured to access the data of the vehicle terminal;

a cloud-cloud gateway unit configured to access the data of the third party platform, wherein the cloud-cloud gateway unit is further configured to perform data interaction with the regional cloud.

In the embodiments of the first aspect of the present application, the edge cloud system further includes:

a cloud computing base module connected to the edge cloud access gateway module, wherein the cloud computing base module is configured to perform in-memory computing and network connection, and manage the data of the road side terminal, the vehicle terminal, the third party platform and the regional cloud.

In the embodiments of the first aspect of the present application, the edge cloud system further includes:

a computing engine module connected to the cloud computing base module, wherein the computing engine module is configured to clean, de-duplicate, and filter the data managed by the cloud computing base module.

According to the embodiments of a second aspect of the present application, a server is provided. The server includes:

an edge cloud access gateway module configured to access data of road side terminal, vehicle terminal, third party platform and regional cloud;

a standardized hierarchical sharing interface module connected to the edge cloud access gateway module, wherein the standardized hierarchical sharing interface module is configured to standardize and classify the data of the road side terminal, the vehicle terminal, the third party platform and the regional cloud accessed by the edge cloud access gateway module to form multiple levels of standardized data, wherein standardized data at each level of the multiple levels of standardized data is available to be called only by a module with corresponding level of that of the standardized data.

According to the embodiments of a third aspect of the present application, a cloud control platform is provided. The cloud control platform includes the edge cloud system according to the embodiments of the first aspect of the present application.

BRIEF DESCRIPTION OF THE DRAWINGS

The drawings are incorporated into the specification and constitute a part of the specification. Further, the drawings illustrate embodiments conforming to the present application, and explain the principle of the present application together with the specification. Nevertheless, the drawings do not constitute an improper limitation of the present application.

DETAILED DESCRIPTION

In order to enable those of ordinary skill in the art to better understand the technical solution of the present application, the technical solution in the embodiments of the present application will be described clearly and completely in conjunction with the accompanying drawings.

It should be noted that the terms "first" and "second" in the specification and claims and the above-mentioned drawings of the present application are used to distinguish similar objects, and are not necessarily used to describe a specific sequence or order. It should be understood that the data used in this way can be interchanged under appropriate circumstances, so that the embodiments of the present application described herein can be implemented in a sequence other than those illustrated or described herein. The implementations described in the following exemplary embodiments do not represent all implementations consistent with the present application. On the contrary, they are merely examples of devices and methods consistent with some aspects of the present application as detailed in the appended claims.

Figure 1:
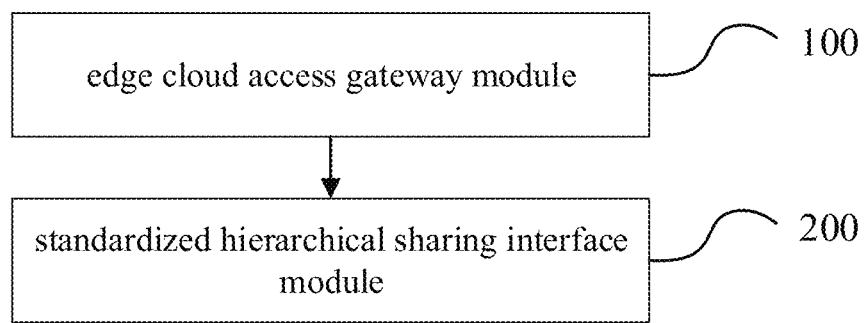
FIG. 1 is a structural schematic diagram of an edge cloud system according to an embodiment of the present application.

As shown in FIG. 1, according to the embodiments of the first aspect of the present application, an edge cloud system is provided. The edge cloud system includes:

an edge cloud access gateway module configured to access data of road side terminal, vehicle terminal, third party platform and regional cloud;

a standardized hierarchical sharing interface module connected to the edge cloud access gateway module, wherein the standardized hierarchical sharing interface module is configured to standardize and classify the data of the road side terminal, the vehicle terminal, the third party platform and the regional cloud accessed by the edge cloud access gateway module to form multiple levels of standardized data, wherein standardized data at each level of the multiple levels of standardized data is available to be called only by a module with corresponding level of that of the standardized data.

According to the above embodiments, the edge cloud system uses the standardized hierarchical sharing interface module to standardize and classify the data of the road side terminal, the vehicle terminal, the third party platform and the regional cloud accessed by the edge cloud access gateway module to form multiple levels of standardized data; wherein standardized data at each level of the multiple levels of standardized data is available to be called only by a module with corresponding level of that of the standardized data. In this way, the edge cloud system decouples the strong binding relationship between the upper-level applications and the lower-level functional components, thereby improving the data processing speed.

In some embodiments of the present application, the edge cloud system further includes:

a cache module connected to the edge cloud access gateway module, wherein the cache module is configured to temporarily cache the data of the road side terminal, the vehicle terminal, the third party platform and the regional cloud accessed by the edge cloud access gateway module.

In some embodiments of the present application, the cache module includes:

a cache replacement strategy module configured to set replacement strategy and cache parameters according to a scenario of the data of the road side terminal, the vehicle terminal, the third party platform and the regional cloud accessed by the edge cloud access gateway module;

an adaptive cache partition configured to select a cache structure according to the replacement strategy and cache the data of the road side terminal, the vehicle terminal, the third party platform and the regional cloud accessed by the edge cloud access gateway module according to the cache parameter.

Because the edge cloud real-time cache processing technology for the existing ICVs does not optimize the cache processing efficiency according to the characteristics of the application scenarios in the intelligent connected vehicle (ICV) field, the cache hit rate is low. Based on the edge cloud architecture provided by the embodiments above, the cache module which is the core component is deeply designed, and an adaptive cache partitioning and efficient cache replacement technology oriented to the characteristics of the application scenarios in the ICV field is proposed, which solves the problem of low cache hit rate.

In some embodiments of the present application, the edge cloud system further includes:

a fusion perception module connected to the standardized hierarchical sharing interface module, wherein the fusion perception module is configured to perform road traffic prediction and analysis according to the data cached by the cache module.

In some embodiments of the present application, the edge cloud system further includes:

a cooperative decision control module connected to the cache module, wherein the cooperative decision control module is configured to perform vehicle driving data analysis and calculation according to the data cached by the cache module.

In some embodiments of the present application, the edge cloud access gateway module includes:

a road-cloud gateway unit configured to access the data of the road side terminal;

a vehicle-cloud gateway unit configured to access the data of the vehicle terminal;

a cloud-cloud gateway unit configured to access the data of the third party platform, wherein the cloud-cloud gateway unit is further configured to perform data interaction with the regional cloud.

In some embodiments of the present application, the edge cloud system further includes:

a cloud computing base module connected to the edge cloud access gateway module, wherein the cloud computing base module is configured to perform in-memory computing and network connection, and manage the data of the road side terminal, the vehicle terminal, the third party platform and the regional cloud.

In some embodiments of the present application, the edge cloud system further includes:

a computing engine module connected to the cloud computing base module, wherein the computing engine module is configured to clean, de-duplicate, and filter the data managed by the cloud computing base module.

Figure 2:
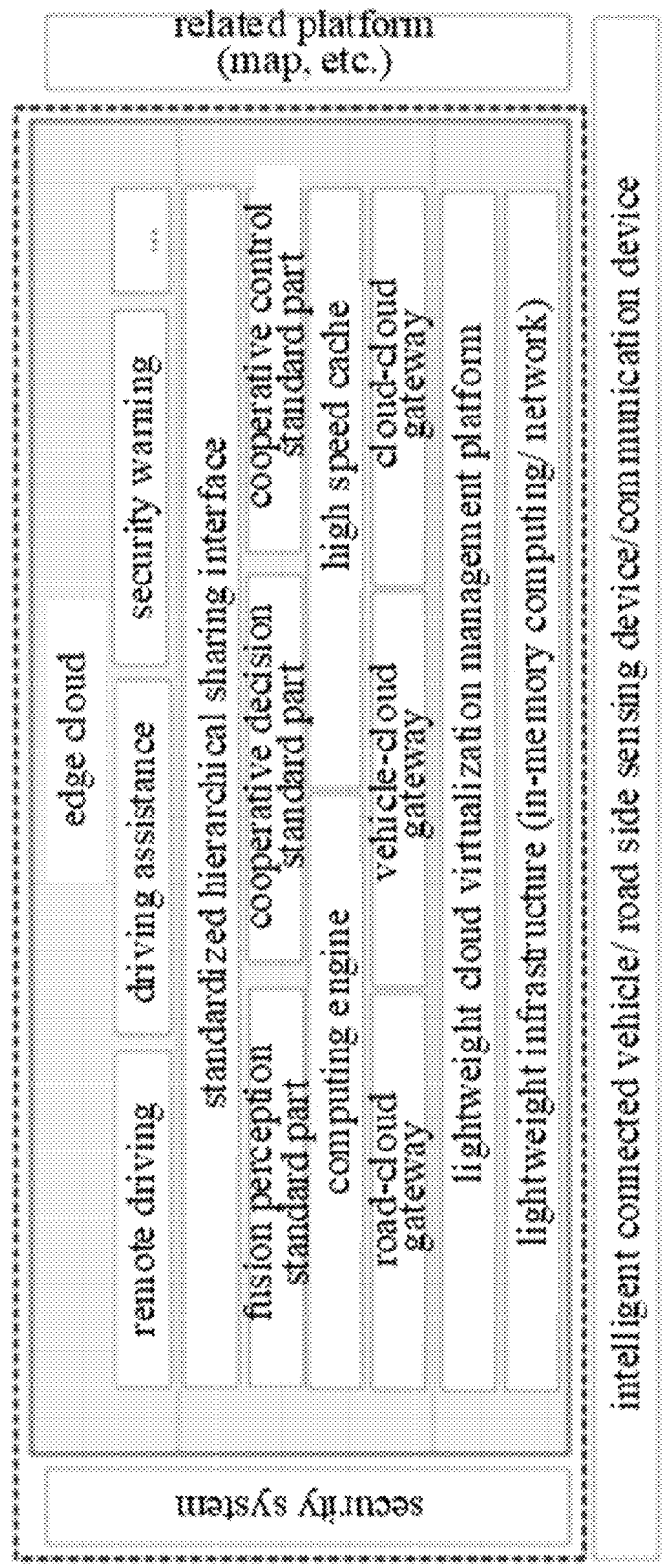
FIG. 2 is a schematic diagram of an edge cloud technology architecture according to an embodiment of the present application.

In a specific embodiment of the present application, an edge cloud architecture based on domain-specific standard parts and data standardized hierarchical sharing is disclosed; the edge cloud mainly includes a lightweight software and hardware platform, an edge cloud access gateway, a computing engine and a high speed cache, data desensitization/standardized hierarchical sharing and other components, and the technical architecture is shown in FIG. 2.

(1) Lightweight Software and Hardware Infrastructure

The edge cloud uses a lightweight hardware and software infrastructure. The hardware part includes a lightweight cloud computing infrastructure, such as in-memory computing and network access resources. The software part includes a lightweight cloud virtualization management platform to complete the virtualization and effective management of hardware resources.

(2) Edge Cloud Access Gateway

The edge cloud access gateway mainly includes a road-cloud gateway, a vehicle-cloud gateway, and a cloud-cloud gateway. The road-cloud gateway is mainly responsible for accessing preliminary perception data of road side radars and cameras uploaded by road side sensing devices into the edge cloud. The vehicle-cloud gateway is mainly responsible for accessing vehicle bus data and preliminary perception data uploaded by the vehicle into the edge cloud. The cloud-cloud gateway function is divided into two parts: the first is responsible for accessing data of the third party platform, such as a real-time weather data platforms, into the edge cloud; the second is responsible for data interaction between the edge cloud and the regional cloud.

(3) Computing Engine Module

The computing engine module first performs preprocessing, such as cleaning, de-duplicating, and filtering of the base data accessed into the edge cloud. Then, via the streaming computing function in the computing engine, the basic calculation and processing and data mining of the data are completed.

(4) High Speed Cache Module

The high speed cache module can temporarily cache the vehicle bus data, vehicle messages, video image data, point-cloud data, etc. obtained by a vehicle-road-cloud integrated communication device, as well as the result data from basic calculation generated by the computing engine for real-time decision-making. The high speed cache module provides subscription and publishing services for the cached data in the form of message queues, provides message multi-topic services for the fusion perception standard part and the cooperative decision/control standard part of the edge cloud, supports for partitioning messages and horizontal expansion through server clusters, and is available to support high throughput and ultra-low latency message distribution and acquisition.

(5) Standardized Hierarchical Sharing Interface

The standardized hierarchical sharing mechanism defines two parts: the first is a standardized data exchange protocol; the second is a hierarchical sharing protocol. Under the multi-level cloud architecture, the edge cloud standardizes the data obtained from the road side terminal and the vehicle terminal for data interaction between the internal modules of the edge cloud and interaction with the third party platform and the regional cloud. The hierarchical sharing protocol clarifies the data level, and different levels of data are available to be called by different levels of standard parts and services. For example, the data called by a third party application has low sensitivity and corresponds to a low sensitivity data level. The data called by the security-related standard part inside the cloud control base platform, such as the cooperative decision/control standard part, has high security requirements and corresponds to a high data level.

(6) Fusion Perception Standard Part

The fusion perception standard part uses camera image data, millimeter wave radar data, and lidar point-cloud data collected by the synchronization timing module of the intelligent IoT gateway, as well as the image data and lidar point-cloud data collected by the road side camera. Specifically, the fusion perception standard part can provide common functions such as real-time lightweight visual inspection model, domain-specific target tracking component, domain-specific multi-source fusion component, domain-specific multi-dimensional data clustering, domain intelligent pre-labeling and verification, vehicle-road data verification component, coordinate conversion component and time matching component. Through the above common functions provided by the fusion perception standard part, it is possible to provide service standard APIs, such as road traffic predictive perception.

(7) Cooperative Decision/Control Standard Part

The cooperative decision/control standard part desensitizes and standardizes the vehicle-road data through the intelligent IoT gateway. The cooperative decision standard part can provide common functions such as accurate mileage calculation component, general fuel consumption calculation component, driving safety risk assessment, collision constraint model, decision warning component, group intelligence decision algorithm, vehicle state estimation component, trajectory correlation model and optimal path planning. Through the above common functions provided by cooperative decision/control standard part, it is possible to support service standard APIs such as single-lane, multi-lane and road network-level decisions.

In some embodiments of the present application, the cache module is deeply designed, and an adaptive cache partitioning and efficient cache replacement technology oriented to the characteristics of the application scenarios in the ICV field is proposed, which solves the problem of low cache hit rate. The cache is partitioned according to application scenarios in the ICV field, and the cache is divided into a vehicle operating data cache region and a vehicle external base data cache region. Vehicle operating data includes powertrain data, chassis data, and vehicle electrical data. The powertrain system generates different data items according to different sources of power (such as fuel, electricity, hybrid, etc.). Chassis data specifically comes from a driveline system, a driving system, a steering system and a braking system. The vehicle electrical data specifically comes from various sensor systems and autopilot controllers. The vehicle external base data includes static data such as traditional road network data, lane model data, road component data, and road attribute data, as well as dynamic data such as real-time traffic data, dynamic environment data, driver data, and traffic service data.

Here, the cache structures and parameter designs of the vehicle operating data cache region and the vehicle external base data cache region are different, and the adjustment methods for related parameters are also different in different application scenarios. For example, for the vehicle operating data of a vehicle passing through a coverage area of a certain edge cloud at high speed, the vehicle operating data will only be called once by the cooperative decision and control standard part, and there is no need to store the vehicle operating data in the vehicle operating data cache region of the edge cloud. On the other hand, for an accident vehicle or a faulty vehicle, the vehicle operating data will be accessed multiple times within a period of time, and thus the vehicle operating data should be stored in the data cache region of the edge cloud for quick recall. Under a condition that the value of the data is judged at the beginning of the generation of the data, and whether to put the data in the cache region is determined according to the value prediction, it is necessary to analyze the access frequency of the data, so as to estimate the value of the data. Therefore, the following cache structure is designed, as shown in Table 1.

TABLE 1

| different cache regions | cache replacement strategy | cache parameters in high-speed straight scene | cache parameters in accident scene | cache parameters in road construction scene |
|---|---|---|---|---|
| vehicle operating data cache | segmented LRU (SLRU) | the preparation segment is larger and the cache segment is smaller | the preparation segment is smaller and the cache segment is larger. | the preparation segment is smaller and the cache segment is larger. |
| vehicle external base data cache | LRU based on CM Sketch (CM-LRU) | CM Sketch has a low empty frequency | CM Sketch has a high empty frequency | CM Sketch has a high empty frequency |

Figure 3:
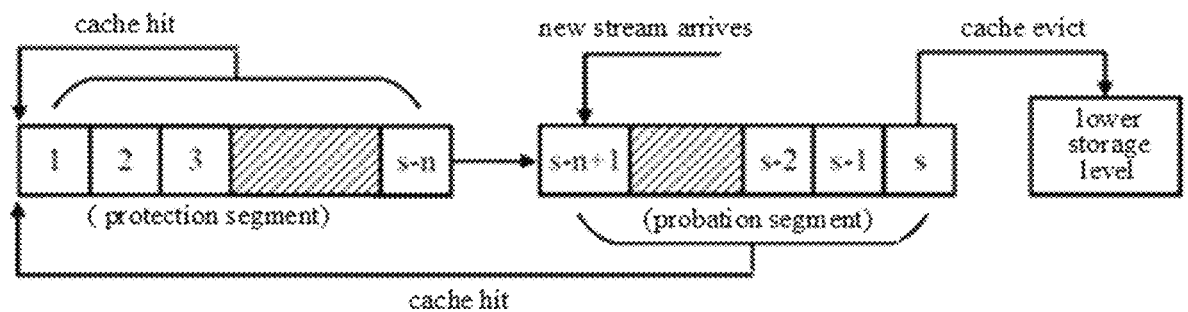
FIG. 3 is a structural schematic diagram of a segmented LRU cache according to an embodiment of the present application.

The cache structure of the segmented least recently used (Segmented Least Recently Used, SLRU) replacement strategy is shown in FIG. 3 below. Here, the cache is divided into two segments, including a protection segment and a probation segment. Here, a new element that arrives for the first time is inserted into the probation segment (Probation); when the element arrives again, the cache hits, and the element is placed in the protection segment (Protection); when the protection segment is full and needs to be replaced, the replaced element will then be inserted into the probation section. In the protection segment and the probation segment, the eviction strategy of least recently used (Least Recently Used, LRU) is adopted. The elements evicted by the probation segment finally enter into a lower storage level, that is, enter into a data storage module of the regional cloud for disk placement processing.

Figure 4:
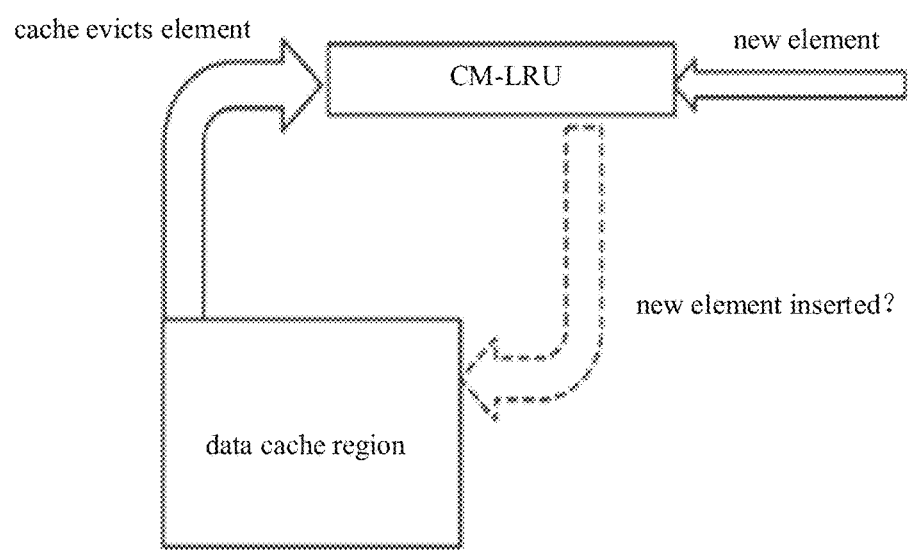
FIG. 4 is a structural schematic diagram of a CM-LRU cache according to an embodiment of the present application.
Figure 5:
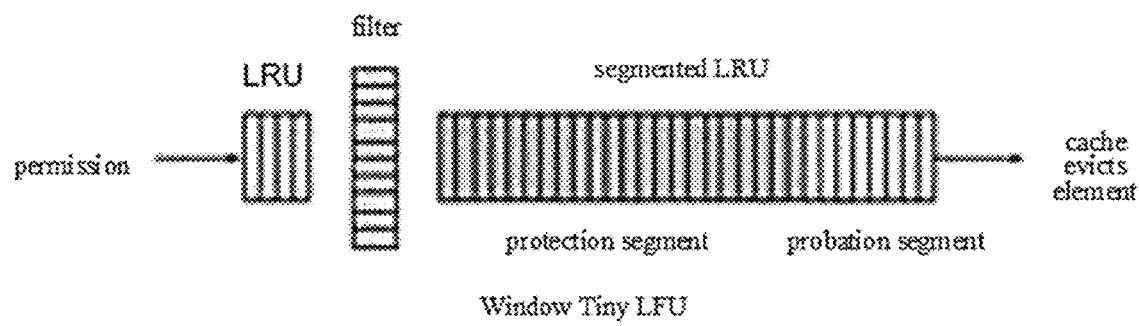
FIG. 5 is a schematic diagram of frequency and cache admission and eviction according to an embodiment of the present application.

The cache structure of count min sketch least recently used (Count Min Sketch Least Recently Used, CM-LRU) replacement strategy is divided into two segments, including a window segment and main cache segment. Here, the window segment uses the least recently used (Least Recently Used, LRU) replacement strategy, and the filter is count min sketch (Count Min Sketch, CM-Sketch); the main cache segment uses the segmented least recently used SLRU replacement strategy, as shown in FIG. 4. FIG. 5 is a schematic diagram of a window tiny least frequently used (Window Tiny Least Frequently Used, Window Tiny LFU) replacement strategy. The front end of the cache structure is a small LRU cache called a window cache LRU. The capacity of the window cache LRU only accounts for about 1% of the total space, and it is designed to store short-term burst access records; when the window cache is eliminated, it will be sent to a DoorKeeper filter; after the filtering is passed, the elements will be stored in a large SLRU cache, the capacity of the SLRU accounts for about 99% of the total space; the SLRU that stores the main elements is an improved LRU, which stores separately the records that are hit at least 2 times in a time window and the records that are hit 1 time. In this way, the more frequent cache elements in the short term can be distinguished, and 80% of the space in the SLRU is allocated to the protection segment, as shown in FIG. 4.

Figure 6:
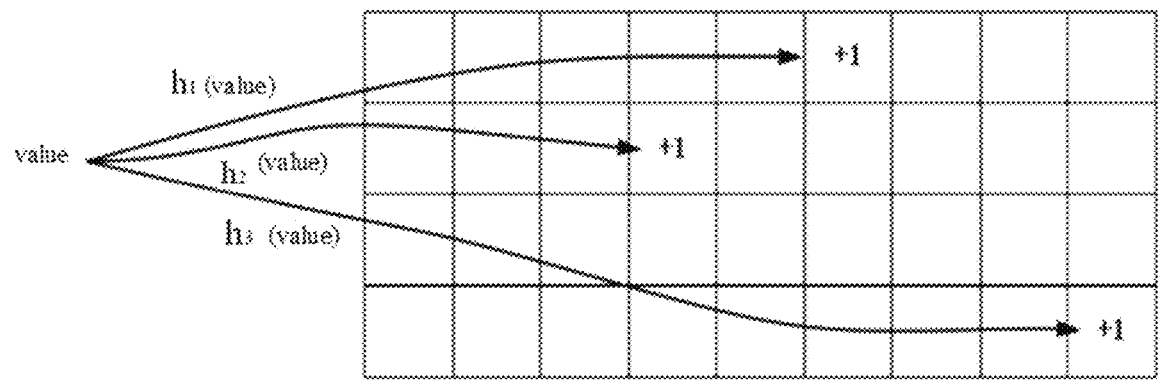
FIG. 6 is a schematic diagram of a frequency statistics method based on CM sketch according to an embodiment of the present application.

The principle of the CM Sketch is shown in FIG. 6. An array of length x is created for counting, and the count value of each element is initialized to 0; for a new element, it is hashed to a number between 0 and x, for example, the hash value i which is a position index of the array; the counter value of the array corresponding to the position index i is incremented by 1. Then, at this time, to query the frequency of occurrence of an element, it is just need to return the count value at the corresponding position index of the array after the element is hashed. Considering the use of hash, there will be conflicts, that is, different elements are hashed to the same position index of the array, and thus the frequency statistics will be larger.

Figure 7:
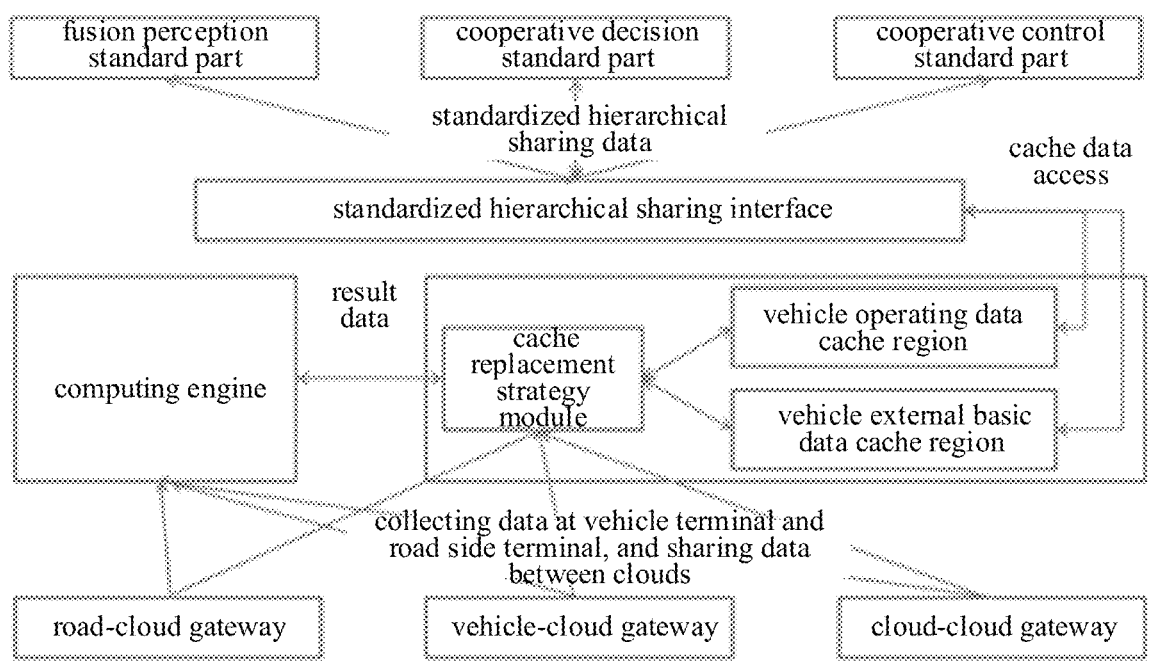
FIG. 7 is a diagram of the relationship between the cache module structure and other modules according to an embodiment of the present application.

The relationship between the cache module structure and other modules based on the above adaptive cache partitioning and efficient cache replacement technology oriented to the characteristics of the application scenarios in the field is shown in FIG. 7.

The edge cloud in the above embodiments can solve the problems that the existing edge cloud architectures of various edge cloud vendors are not universal, each constitutes an information silo system, and the independent system is incompatible. It is beneficial to promote the standardized data sharing of the edge cloud and reduce the construction cost of the edge cloud. It can also solve the problems of low efficiency, low cache hit rate, and frequent data switching when the real-time cache processing technology in the existing edge cloud cache module is applied to the specific domain of ICVs.

According to the embodiments of a second aspect of the present application, a server is provided. The server includes:

an edge cloud access gateway module configured to access data of road side terminal, vehicle terminal, third party platform and regional cloud;

a standardized hierarchical sharing interface module connected to the edge cloud access gateway module, wherein the standardized hierarchical sharing interface module is configured to standardize and classify the data of the road side terminal, the vehicle terminal, the third party platform and the regional cloud accessed by the edge cloud access gateway module to form multiple levels of standardized data, wherein standardized data at each level of the multiple levels of standardized data is available to be called only by a module with corresponding level of that of the standardized data. During the operation of the server, each process of the edge cloud system described in the above embodiments is implemented, and the same technical effects can be achieved. In order to avoid repetition, details are not repeated here.

According to the embodiments of a third aspect of the present application, a cloud control platform is provided. The cloud control platform includes the edge cloud system according to the embodiments of the first aspect of the present application. During the operation of the cloud control platform, each process of the edge cloud system described in the above embodiments is implemented, and the same technical effects can be achieved. In order to avoid repetition, details are not repeated here.

The embodiments of the present application are described above with reference to the accompanying drawings, but the present application is not limited to the above specific embodiments. The above specific embodiments are only illustrative and not restrictive. Under the inspiration of the present application, those of ordinary skill in the art can make many changes without departing from the purpose of the present application and the protection scope of the claims, all of which fall within the protection of the present application.

What is claimed is:

1. An edge cloud system, comprising:
    an edge cloud access gateway module configured to access data of road side terminal, vehicle terminal, third party platform and regional cloud;
    a standardized hierarchical sharing interface module connected to the edge cloud access gateway module, wherein the standardized hierarchical sharing interface module is configured to standardize and classify the data of the road side terminal, the vehicle terminal, the third party platform and the regional cloud accessed by the edge cloud access gateway module to form multiple levels of standardized data,
    wherein standardized data at each level of the multiple levels of standardized data is available to be called only by a module with corresponding level of that of the standardized data, and
    wherein the edge cloud system further comprises:
    a cache module connected to the edge cloud access gateway module,
    wherein the cache module is configured to temporarily cache the data of the road side terminal, the vehicle terminal, the third party platform and the regional cloud accessed by the edge cloud access gateway module, and
    wherein the cache module comprises:
        a cache replacement strategy module configured to set replacement strategy and cache parameters according to the scenario of the data of the road side terminal, the vehicle terminal, the third party platform and the regional cloud accessed by the edge cloud access gateway module; and
        an adaptive cache partition configured to select cache structure according to the replacement strategy and cache the data of the road side terminal, the vehicle terminal, the third party platform and the regional cloud accessed by the edge cloud access gateway module according to the cache parameters.

2. The edge cloud system according to claim 1, further comprising:
    a fusion perception module connected to the standardized hierarchical sharing interface module, wherein the fusion perception module is configured to perform road traffic prediction and analysis according to the data cached by the cache module.

3. The edge cloud system according to claim 1, further comprising:
    a cooperative decision control module connected to the cache module, wherein the cooperative decision control module is configured to perform vehicle driving data analysis and calculation according to the data cached by the cache module.

4. The edge cloud system according to claim 1, wherein the edge cloud access gateway module comprises:
    a road-cloud gateway unit configured to access the data of the road side terminal;
    a vehicle-cloud gateway unit configured to access the data of the vehicle terminal;
    a cloud-cloud gateway unit configured to access the data of the third party platform, wherein the cloud-cloud gateway unit is further configured to perform data interaction with the regional cloud.

5. The edge cloud system according to claim 1, further comprising:
    a cloud computing base module connected to the edge cloud access gateway module, wherein the cloud computing base module is configured to perform in-memory computing and network connection, and manage the data of the road side terminal, the vehicle terminal, the third party platform and the regional cloud.

6. The edge cloud system according to claim 5, further comprising:
    a computing engine module connected to the cloud computing base module, wherein the computing engine module is configured to clean, de-duplicate, and filter the data managed by the cloud computing base module.

7. A cloud control platform, wherein the cloud control platform comprises the edge cloud system according to claim 1.

8. A server, comprising:
    an edge cloud access gateway module configured to access data of the road side terminal, the vehicle terminal, the third party platform and the regional cloud;
    a standardized hierarchical sharing interface module connected to the edge cloud access gateway module, wherein the standardized hierarchical sharing interface module is configured to standardize and classify the data of the road side terminal, the vehicle terminal, the third party platform and the regional cloud accessed by the edge cloud access gateway module to form multiple levels of standardized data, wherein standardized data at each level of the multiple levels of standardized data is available to be called only by a module with corresponding level of that of the standardized data, and wherein the server further comprises:

a cache module connected to the edge cloud access gateway module, wherein the cache module is configured to temporarily cache the data of the road side terminal, the vehicle terminal, the third party platform and the regional cloud accessed by the edge cloud access gateway module, and wherein the cache module comprises:
- a cache replacement strategy module configured to set replacement strategy and cache parameters according to the scenario of the data of the road side terminal, the vehicle terminal, the third party platform and the regional cloud accessed by the edge cloud access gateway module; and
- an adaptive cache partition configured to select cache structure according to the replacement strategy and cache the data of the road side terminal, the vehicle terminal, the third party platform and the regional cloud accessed by the edge cloud access gateway module according to the cache parameters.

* * * * *